(12) United States Patent
Duesberg et al.

(10) Patent No.: US 7,731,928 B2
(45) Date of Patent: Jun. 8, 2010

(54) SILANIZED CARBON NANOTUBES AND METHOD FOR THE PRODUCTION THEREOF

(75) Inventors: Georg Duesberg, Dresden (DE); Maik Liebau, Munich (DE); Eugen Unger, Munich (DE)

(73) Assignee: Qimonda AG, Munich (DE)

( * ) Notice: Subject to any disclaimer, the term of this patent is extended or adjusted under 35 U.S.C. 154(b) by 474 days.

(21) Appl. No.: 11/569,900

(22) PCT Filed: Apr. 21, 2005

(86) PCT No.: PCT/EP2005/004310

§ 371 (c)(1),
(2), (4) Date: Jul. 11, 2007

(87) PCT Pub. No.: WO2005/118472

PCT Pub. Date: Dec. 15, 2005

(65) Prior Publication Data

US 2007/0248523 A1    Oct. 25, 2007

(30) Foreign Application Priority Data

Jun. 1, 2004    (DE) ........................ 10 2004 026 576

(51) Int. Cl.
*D01F 9/12*    (2006.01)

(52) U.S. Cl. .................. 423/447.1; 423/447.7

(58) Field of Classification Search ............. 423/447.1, 423/447.7
See application file for complete search history.

(56) References Cited

U.S. PATENT DOCUMENTS 6,203,814 B1    3/2001    Fisher et al.

FOREIGN PATENT DOCUMENTS

| WO | WO-01/07694 | 2/2001 |
| WO | WO-01/58909 A1 | 8/2001 |
| WO | WO-02/095098 | 11/2002 |
| WO | WO-2005/012171 | 2/2005 |

OTHER PUBLICATIONS

Wei et al., Nature, vol. 416, pp. 495-496 (2002).
Ren et al., Science, vol. 282, pp. 1105-1107 (1998).
Cees Dekker, Physics Today, pp. 22-28 (1999).
Seeger et al., Chemical Physics Letters 339, pp. 41-46 (2001).
Velasco-Santos et al., Nanotechnology, vol. 13, pp. 495-498 (2002).

*Primary Examiner*—Edward M Johnson
(74) *Attorney, Agent, or Firm*—Dickstein Shapiro LLP

(57) ABSTRACT

A process for silanizing carbon nanotubes, wherein the carbon nanotubes are oxidized and subsequently exposed to a saturated gas phase including one or more organosilane derivatives which form covalent bonds to the carbon nanotubes with siloxane formation.

18 Claims, No Drawings

SILANIZED CARBON NANOTUBES AND METHOD FOR THE PRODUCTION THEREOF

CROSS-REFERENCE TO RELATED APPLICATION

This application is a national phase application of International Patent Application Serial No. PCT/EP2005/004310, filed Apr. 21, 2005, which published in German on Dec. 15, 2005 as WO 2005/118472.

FIELD OF THE INVENTION

The present invention relates to silanized carbon nanotubes, a process for producing them and the use of silanized carbon nanotubes.

BACKGROUND OF THE INVENTION

Nanotubes, in particular carbon nanotubes, are suitable as metallic conductors and as semiconductors in nanoelectronics. Furthermore, the carbon nanotubes are used, for example, as composite materials, sensors or semiconductor elements in transistors. However, physical and/or chemical modification of the surface of the nanotubes is in many cases a prerequisite for their use. Such modifications include, for example, modification by means of a dielectric for transistor applications. Here, the dielectric, for example a silane layer, is used as insulator between the active path (carbon nanotubes) of the transistor and a gate electrode.

Furthermore, dielectrics are required for applications as intermetal compound in order to screen the electrically conductive carbon nanotubes from the environment. In addition, alteration of the wettability of the surface of carbon nanotubes is important for their use in composites and for chemical modification in sensor applications.

DETAILED DESCRIPTION OF THE INVENTION

Carbon nanotubes are coated with a dielectric material, with this coating being stable even at elevated temperatures. Further, a process produces carbon nanotubes which have been coated in this manner.

A process for silanizing carbon nanotubes, wherein the carbon nanotubes are firstly oxidized and subsequently exposed to a saturated gas phase including one or more organosilane derivatives which form covalent bonds to the carbon nanotubes with siloxane formation.

Also, carbon nanotubes can be obtained by this process. The siloxanes produced surprisingly form homogeneous, virtually defect-free coatings on the carbon nanotubes.

For the purposes of the present invention, a carbon nanotube is any type of nanotube which can, inter alia, be doped or functionalized on one or more walls. For the purposes of the present invention, silanization is the production of monolayers or multilayers of organosilanes on the surface of the carbon nanotubes.

Depending on the type of derivative, the organosilane derivatives form, with siloxane formation, covalent bonds to the carbon nanotube ($R_3SiX$ derivatives), to the carbon nanotube and to a neighbor ($R_2SiX_2$ derivatives) or to the carbon nanotube and crosslinks between the tubes ($RSiX_3$ derivatives). If not the pure derivatives but mixtures thereof are used, it is found that complex crosslinking is obtained, corresponding to the composition of the mixture. Preference is given to using $RSiX_3$ silane derivatives.

Preferred organosilane derivatives are alkyl silane or aryl silane derivatives of the formula $RSiX_3$, $R_2SiX_2$ or $R_3SiX$, where X is a functional group. Preference is also given to mixtures of two or three of these organosilane derivatives. Preferred functional groups X are chloride, bromide, alkoxy groups having straight-chain or branched $C_1$-$C_{30}$ radicals, phenoxy, benzyloxy or naphthoxy.

The radicals R are each, independently of one another, an organic radical. Preferred radicals are alkyl, aryl, alkenyl, alkynyl, amino and hydroxyl groups, with alkyl and aryl groups being particularly preferred.

Alkyl groups used are in particular straight-chain or branched $C_1$-$C_{30}$ groups or ($C_3$-$C_7$)-cycloalkyl groups. Aryl groups used are in particular phenyl, benzyl, naphthyl, phenanthryl or pyridyl which may each be substituted by one, two or three substituents selected independently from the group consisting of a straight-chain or branched ($C_1$-$C_6$)-alkyl radical, a ($C_3$-$C_7$)-cycloalkyl radical, a straight-chain or branched ($C_1$-$C_6$)-alkoxy radical, hydroxy, amino, di($C_1$-$C_6$) alkylamino, nitro and cyano. As alkenyl group, it is possible to use, for example, vinyl or propenyl. As alkynyl group, it is possible to use, for example, ethynyl.

Compounds of the formula $R_3Si$—$NH$—$SiR_3$ (disilazanes) can likewise be used for coating the carbon nanotubes. In this embodiment too, R is an organic radical as defined above. Preferred radicals are then methyl, chloromethyl, phenyl, vinyl and amino groups or cyclic trisilazanes such as hexamethylcyclotrisilazane.

Oxidized carbon nanotubes are firstly provided. The oxidation of the carbon nanotubes is carried out by means of oxygen or any other suitable oxidant in solution or in the gas phase. For example, the oxidation is carried out in solution using hypochlorite or in the gas phase at temperatures above 500° C.

The degree of oxidation, i.e. the number of oxidized groups per unit area, is usually kept low. The oxidation is typically carried out so that the degree of oxidation of the oxidized carbon nanotubes is in the range from 0.2 to 1.0 hydroxyl group per square nanometer. The degree of oxidation is typically 0.5 hydroxyl group per square nanometer.

The carbon nanotubes which have been functionalized in this way are subsequently dispersed in a solvent such as dimethylformamide and applied to a suitable substrate surface. In a preferred process, the carbon nanotubes are grown directly on the substrate and oxidized in the gas phase.

The subsequent silanization of the carbon nanotubes is carried out in an inert gas atmosphere saturated with gaseous organosilane derivatives (vapor phase of a solution of the silane in an aprotic solvent). A preferred inert gas is nitrogen. Possible aprotic solvents are, for example, toluene, pentane, hexane, petroleum ether and cyclohexane and also dimethylformamide or dimethyl sulfoxide. Toluene is particularly useful as solvent.

The reaction conditions such as reaction time, reaction temperature and concentration of the organosilane derivative are selected as a function of the reaction product and can be determined by a person skilled in the art by means of simple experiments. The silanization is usually carried out at a temperature in the range from 15° C. to 130° C., preferably from 20° C. to 100° C., for a time of from 1 minute to 24 hours, with the initial reaction, i.e. the bonding of the silanes to the carbon nanotubes, being complete within minutes. The temperature selected is dependent essentially on the solvent used or its vapor pressure. It is usual to use an aprotic solvent such as toluene (which solvents can additionally be explicitly mentioned here) which has a vapor pressure in the range from 0.01 bar to 5 bar, at room temperature. The concentration of the organosilane in the solvent is typically 1 mM.

To increase the resulting layer thickness, it is possible, for example, to alter the reaction atmosphere. Even traces of moisture are sufficient to crosslink derivatives of the formula $R_2SiX_2$ or $RSiX_3$. This crosslinking can be controlled in a targeted manner in order to produce covalently bound oxide envelopes having a thickness of from 0.01 µm to 10 µm, preferably from 0.01 µm to 1 µm.

During adsorption, the functional groups X react with the hydroxy groups present on the carbon nanotubes. A monolayer is obtained as a result. An increase in the layer thickness is achieved by reaction of unbound functional groups X in the presence of water. This crosslinking does not take place in the case of derivatives of the formula $R_3SiX$ because the reaction with the functional group X does not make a further functional group X available here. The derivatives of the formulae $R_2SiX_2$ and $RSiX_3$ bond covalently both to the carbon nanotube and to one another with siloxane formation.

An embodiment of the present invention is illustrated by the following example, without the invention being restricted thereto.

EXAMPLE

Carbon nanotubes are firstly grown by catalytic gas-phase deposition at 600° C. The multiwall carbon nanotubes obtained in this way are subsequently oxidized in air at 700° C. The oxidation is carried out for a time of 1 minute. Finally, the carbon nanotubes are dispersed in dimethylformamide and then applied to a substrate, for example silicon.

The substrate coated with carbon nanotubes is exposed to a gas mixture comprising nitrogen as inert gas and the vapor phase of a 1 mmol solution of octadecyltrichlorosilane in toluene (vapor pressure: 0.2 bar (25° C.)).

The silanization of the carbon nanotubes takes place at room temperature over a period of 12 hours. The substrate coated with the carbon nanotubes is subsequently removed from the silane vapor phase and left for another 5 minutes in pure nitrogen.

A homogeneous coating on the carbon nanotubes is obtained. This coating or envelope can be confirmed in a scanning electron microscope by means of the altered diameter (+about 10%) of the carbon nanotubes examined.

The invention claimed is:

1. A process for silanizing carbon nanotubes, wherein the carbon nanotubes are oxidized and subsequently exposed to a saturated gas phase comprising one or more organosilane derivatives which form covalent bonds to the carbon nanotubes with siloxane formation.

2. The process as claimed in claim 1, wherein the silanization is carried out by exposing the oxidized carbon nanotubes to a gas mixture comprising an inert gas and the vapor phase of a solution of one or more organosilane derivatives in an aprotic solvent.

3. The process as claimed in claim 1, wherein organosilane derivatives of the general formula $RSiX_3$, $R_2SiX_2$ or $R_3SiX$ or mixtures of two or three of these organosilane derivatives are used, where X is a functional group selected from the group consisting of chloride, bromide, alkoxy groups having straight-chain or branched $C_1$-$C_{30}$ radicals, phenoxy, benzyloxy, and naphthoxy, and the radicals R are each, independently of one another, an organic radical selected from the group consisting of alkyl, aryl, alkenyl, alkynyl, amino, and hydroxyl groups.

4. The process as claimed in claim 2, wherein organosilane derivatives of the general formula $RSiX_3$, $R_2SiX_2$ or $R_3SiX$ or mixtures of two or three of these organosilane derivatives are used, where X is a functional group selected from the group consisting of chloride, bromide, alkoxy groups having straight-chain or branched $C_1$-$C_{30}$ radicals, phenoxy, benzyloxy, and naphthoxy, and the radicals R are each, independently of one another, an organic radical selected from the group consisting of alkyl, aryl, alkenyl, alkynyl, amino, and hydroxyl groups.

5. The process as claimed in claim 1, wherein the silanization is carried out at a temperature in a range from 15° C. to 130° C. for a time of from 1 minute to 24 hours.

6. The process as claimed in claim 5, wherein the silanization is carried out at a temperature in a range from 20° C. to 100° C.

7. The process as claimed in claim 2, wherein the silanization is carried out at a temperature in a range from 15° C. to 130° C. for a time of from 1 minute to 24 hours.

8. The process as claimed in claim 7, wherein the silanization is carried out at a temperature in a range from 20° C. to 100° C.

9. The process as claimed in claim 3, wherein the silanization is carried out at a temperature in a range from 15° C. to 130° C. for a time of from 1 minute to 24 hours.

10. The process as claimed in claim 9, wherein the silanization is carried out at a temperature in a range from 20° C. to 100° C.

11. The process as claimed in claim 1, wherein the oxidation is carried out so that the degree of oxidation of the oxidized carbon nanotubes is in a range from 0.2 to 1.0 hydroxyl group per square nanometer.

12. The process as claimed in claim 2, wherein the oxidation is carried out so that the degree of oxidation of the oxidized carbon nanotubes is in a range from 0.2 to 1.0 hydroxyl group per square nanometer.

13. The process as claimed in claim 3 wherein the oxidation is carried out so that the degree of oxidation of the oxidized carbon nanotubes is in a range from 0.2 to 1.0 hydroxyl group per square nanometer.

14. The process as claimed in claim 5, wherein the oxidation is carried out so that the degree of oxidation of the oxidized carbon nanotubes is in a range from 0.2 to 1.0 hydroxyl group per square nanometer.

15. The process as claimed in claim 1, wherein the carbon nanotubes are grown directly on a substrate and are oxidized in the gas phase.

16. The process as claimed in claim 3, wherein the organosilane derivative is a mixture of two or three of the organosilane derivatives.

17. The process as claimed in claim 4, wherein the organosilane derivative is a mixture of two or three of the organosilane derivatives.

18. The process of claim 17, wherein the oxidation is carried out so that the degree of oxidation of the oxidized carbon nanotubes is in the range of 0.2 to 1.0 hydroxyl groups per square nanometer, and the silanization is carried out at a temperature in a range from 15° C. to 130° C. for a time of from 1 minute to 24 hours.

* * * * *